(12) United States Patent
Hammarwall et al.

(10) Patent No.: US 9,660,778 B2
(45) Date of Patent: *May 23, 2017

(54) SYSTEM AND METHOD FOR ALLOCATING TRANSMISSION RESOURCES

(71) Applicant: TELEFONAKTIEBOLAGET L M ERICSSON (PUBL), Stockholm (SE)

(72) Inventors: David Hammarwall, Stockholm (SE); George Jöngren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 146 days.

This patent is subject to a terminal disclaimer.

(21) Appl. No.: 14/246,972

(22) Filed: Apr. 7, 2014

(65) Prior Publication Data

US 2014/0219214 A1 Aug. 7, 2014

Related U.S. Application Data

(63) Continuation of application No. 13/097,260, filed on Apr. 29, 2011, now Pat. No. 8,699,435.

(Continued)

(51) Int. Cl.
H04W 4/00 (2009.01)
H04L 5/00 (2006.01)
(Continued)

(52) U.S. Cl.
CPC ............ H04L 5/0042 (2013.01); H04L 1/003 (2013.01); H04L 1/0079 (2013.01);
(Continued)

(58) Field of Classification Search
CPC ..... H04L 1/003; H04L 1/0079; H04L 1/1664; H04L 1/1671; H04L 5/0044;
(Continued)

(56) References Cited

U.S. PATENT DOCUMENTS 8,335,165 B2  12/2012  Shen et al.
8,625,554 B2  1/2014   Zhang et al.
(Continued)

OTHER PUBLICATIONS

3GPP 3rd Generation Partnership Project; Technical Specification Group Radio Access Network; Evolved Universal Terrestrial Radio Access (E-UTRA); Multiplexing and Channel Coding (Release 9) 3GPP TS 36.212 v9.1.0 (Mar. 2010).

*Primary Examiner* — Brian J Gillis
*Assistant Examiner* — Thao Duong
(74) *Attorney, Agent, or Firm* — Boisbrun Hofman, PLLC (57) ABSTRACT

A method for wirelessly transmitting data and control information using a plurality of transmission layers includes determining a number of bits in user data codewords to be transmitted during a subframe and calculating a number of control vector symbols to allocate to control information during the subframe. The number of control vector symbols is calculated based on the number of bits in the user data codewords to be transmitted during the subframe and an estimate of the number of vector symbols onto which the user data codewords will be mapped. The estimate of the number of vector symbols depends on the number of control vector symbols to be allocated to control information. The control codewords may be mapped to the calculated number of control vector symbols and transmitting vector symbols carrying the user data codewords and the control codewords over the plurality of transmission layers during the subframe.

30 Claims, 5 Drawing Sheets

Related U.S. Application Data (60) Provisional application No. 61/329,594, filed on Apr. 30, 2010.

(51) Int. Cl.
*H04L 1/00* (2006.01)
*H04L 1/16* (2006.01)

(52) U.S. Cl.
CPC .......... *H04L 5/0016* (2013.01); *H04L 5/0044* (2013.01); *H04L 5/0053* (2013.01); *H04L 1/1664* (2013.01); *H04L 1/1671* (2013.01)

(58) Field of Classification Search
CPC ... H04L 5/0053; H04L 5/0016; H04L 1/0618; H04L 25/03929; H04L 5/0042
See application file for complete search history.

(56) References Cited

U.S. PATENT DOCUMENTS

| | | | |
|---|---|---|---|
| 8,670,430 B2 | 3/2014 | Lee et al. | |
| 8,670,496 B2 | 3/2014 | Nam et al. | |
| 2008/0192718 A1* | 8/2008 | Jongren | H04B 7/0617 370/342 |
| 2009/0225700 A1* | 9/2009 | Shen | H04W 8/30 370/328 |
| 2010/0054353 A1* | 3/2010 | Roh | H04L 1/0041 375/260 |
| 2010/0195624 A1* | 8/2010 | Zhang | H04B 7/0413 370/335 |
| 2010/0296603 A1 | 11/2010 | Lee et al. | |
| 2011/0013615 A1* | 1/2011 | Lee | H04L 5/0023 370/344 |

* cited by examiner

SYSTEM AND METHOD FOR ALLOCATING TRANSMISSION RESOURCES

PRIORITY CLAIM UNDER 35 U.S.C. §119(e)

This application claims the benefit of U.S. Provisional Application No. 61/329,594, filed Apr. 30, 2010, entitled "Control Allocation for Large Uplink Control Information Payloads," and is a continuation of U.S. Non-Provisional Ser. No. 13/097,260, filed Apr. 29, 2011, entitled "System and Methods for Allocating Transmission Resources" which is incorporated by reference in its entirety.

TECHNICAL FIELD OF THE INVENTION

This disclosure relates in general to wireless communication and, more particularly, to resource allocation for multi-antenna transmissions.

BACKGROUND OF THE INVENTION

Multi-antenna transmission techniques can significantly increase the data rates and reliability of wireless communication systems, especially in systems where the transmitter and the receiver are both equipped with multiple antennas to permit the use of multiple-input multiple-output (MIMO) transmission techniques. Advanced communication standards such as Long Term Evolution (LTE) Advanced utilize MIMO transmission techniques that may permit data to be transmitted over multiple different spatially-multiplexed channels simultaneously, thereby significantly increasing data throughput.

While MIMO transmission techniques can significantly increase throughput, such techniques can greatly increase the complexity of managing radio channels. Additionally, many advanced communication technologies, such as LTE, rely on a substantial amount of control signaling to optimize the configuration of transmitting devices and their use of the shared radio channel. Because of the increased amount of control signaling in advanced communication technologies, it is often necessary for user data and control signaling to share transmission resources. For example, in LTE systems, control signaling and user data are, in certain situations, multiplexed by user equipment ("UE") for transmission over a physical uplink shared channel ("PUSCH").

However, conventional solutions for allocating transmission resources are designed for use with single layer transmission schemes in which only a single codeword of user data is transmitted at a time. Additionally, conventional solutions may not consider the size of the control information to be transmitted, when determining the number of vector symbols to allocate to each bit of control information. As a result, such resource allocation solutions fail to provide optimal allocation of transmission resources between control information and user data when MIMO techniques are being utilized to transmit data on multiple layers simultaneously, especially when a large amount of control information must be transmitted.

SUMMARY OF THE INVENTION

In accordance with the present disclosure, certain disadvantages and problems associated with wireless communication have been substantially reduced or eliminated. In particular, certain devices and techniques for allocating transmission resources between control information and user data are described.

In accordance with one embodiment of the present disclosure, a method for wirelessly transmitting data and control information using a plurality of transmission layers includes determining a number of bits in one or more user data codewords to be transmitted during a subframe and calculating a number of control vector symbols to allocate to control information during the subframe. The number of control vector symbols is calculated based at least in part on the number of bits in the one or more user data codewords to be transmitted during the subframe and an estimate of the number of vector symbols onto which the one or more user data codewords will be mapped. The estimate of the number of vector symbols depends, at least in part, on the number of control vector symbols to be allocated to control information. The method also includes mapping one or more control codewords to the calculated number of control vector symbols and transmitting vector symbols carrying the one or more user data codewords and the one or more control codewords over the plurality of transmission layers during the subframe.

In accordance with another embodiment of the present disclosure, a method for receiving user data and control information transmitted wirelessly over a plurality of transmission layers includes receiving a plurality of vector symbols over a plurality of transmission layers. The method also includes determining a number of bits in one or more user data codewords carried by the vector symbols and calculating a number of control vector symbols that have been allocated to control information during the subframe. The number of control vector symbols is calculated based at least in part on the number of bits in the one or more user data codewords during the subframe and an estimate of the number of vector symbols onto which the one or more user data codewords will be mapped. The estimate of the number of vector symbols depends, at least in part, on the number of control vector symbols to be allocated to control information. The method also includes decoding the received vector symbols based on the calculated number of control vector symbols.

Additional embodiments include apparatuses capable of implementing the above methods and/or variations thereof.

Important technical advantages of certain embodiments of the present invention include reducing the overhead associated with transmitting control signaling by matching the allocation to the quality of the channel indicated by the payloads of the data codewords. Particular embodiments may provide additional benefits by accounting for the amount of control information to be transmitted when determining how much transmission resources to use in transmitting each bit of control information. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
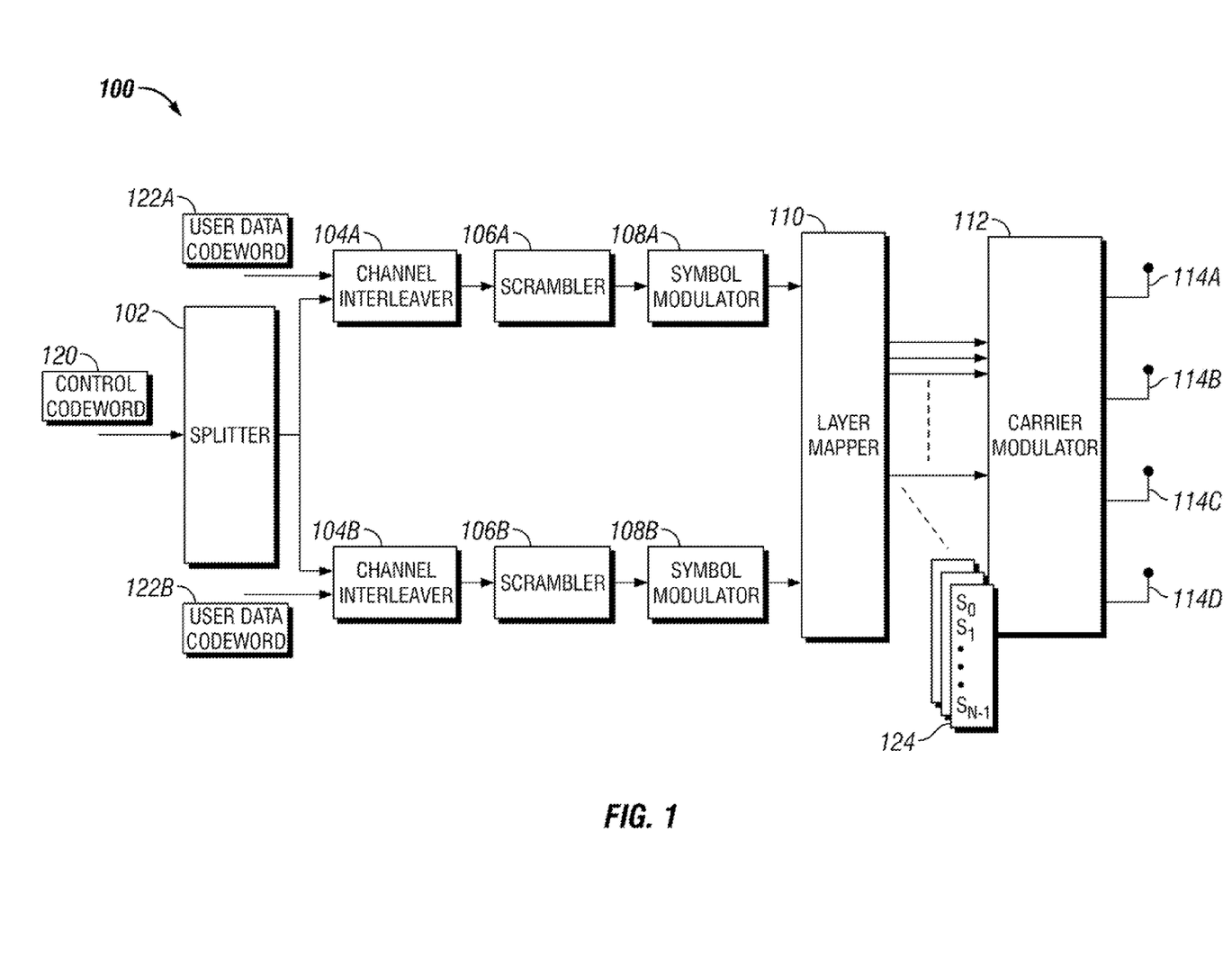
FIG. 1 is a functional block diagram illustrating a particular embodiment of a multi-antenna transmitter.

FIG. 1 is a functional block diagram illustrating a particular embodiment of a multi-antenna transmitter 100. In particular, FIG. 1 shows a transmitter 100 configured to multiplex certain control signaling with user data for transmission over a single radio channel. The illustrated embodiment of transmitter 100 includes a splitter 102, a plurality of channel interleavers 104, a plurality of scramblers 106, a plurality of symbol modulators 108, a layer mapper 110, and a carrier modulator 112. Transmitter 100 allocates transmission resources to control signaling on multiple transmission layers based on an estimate of the quality of the radio channel over which transmitter 100 will transmit. As described further below, particular embodiments of transmitter 100 reduce the overhead for transmitted control information by using an estimate of the data payloads of multiple layers and/or codewords as a measure of the channel quality.

Control signaling can have a critical impact on the performance of wireless communication systems. As used herein, "control signaling" and "control information" refers to any information communicated between components for purposes of establishing communication, any parameters to be used by one or both of the components in communicating with one another (e.g., parameters relating to modulation, encoding schemes, antenna configurations), any information indicating receipt or non-receipt of transmissions, and/or any other form of control information. For example, in LTE systems, control signaling in the uplink direction includes, for example, Hybrid Automatic Repeat reQuest (HARQ) Acknowledgments/Negative Acknowledgements (ACK/NAKs), precoder matrix indicators (PMIs), rank indicators (RIs), and channel quality indicators (CQIs), which are all used by the eNodeB to get confirmation of successful reception of transport blocks or to improve the performance of downlink transmissions. Although control signaling is often transmitted on separate control channels, such as the physical uplink control channel (PUCCH) in LTE, it may be beneficial or necessary to transmit control signaling on the same channel as other data.

For example, in LTE systems, when a periodic PUCCH allocation coincides with a scheduling grant for a user equipment (UE) to transmit user data, the user data and control signaling share transmission resources to preserve the single-carrier property of the discrete Fourier transform, spread orthogonal frequency-division multiplexing (DFTS-OFDM) transmission techniques used by LTE UEs. Furthermore, when a UE receives a scheduling grant to transmit data on the physical uplink shared channel (PUSCH), it typically receives information from the eNodeB related to the characteristics of the uplink radio propagation channel and other parameters that can be used to improve the efficiency of PUSCH transmissions. Such information may include modulation and coding scheme (MCS) indicators as well as, for UEs capable of using multiple transmission antennas, PMIs or RIs. As a result, UEs may be able to use this information to optimize PUSCH transmissions for the radio channel, thereby increasing the amount of data that can be transmitted for a given set of transmission resources. Thus, by multiplexing control signaling with the user data transmitted on PUSCH, a UE can support significantly larger control payloads than when transmitting control signaling by itself on PUCCH.

It may be possible to multiplex control signaling and user data by simply dedicating a set amount of the time-domain transmission resources to control information and then perform carrier modulation and precoding of the control signaling along with the data. In this way control and data are multiplexed and transmitted in parallel on all sub-carriers. For example, in LTE Release 8, DFTS-OFDM symbols are formed from a predetermined number of information vector symbols. As used herein, a "vector symbol" may represent any collection of information that includes an information element associated with each transmission layer over which the information is to be transmitted. Assuming a normal cyclic prefix length, fourteen of these DFTS-OFDM symbols can be transmitted in each uplink subframe. A predetermined number and distribution of these symbols are used to transmit various types of control signaling and the remaining symbols may be used to transmit user data.

Since control signaling and user data may each be associated with different block error-rate requirements, control signaling is often encoded separately and using a different encoding scheme from user data. For example, user data is often encoded with turbo codes or low-density parity-check (LDPC) codes that are highly efficient for longer block lengths (i.e., larger blocks of information bits). Control signaling that uses only a small amount of information bits, such as HARQ ACK/NAK signaling or rank indicators, is often most efficiently encoded using a block code. For medium-sized control signaling, such as larger size CQI reports, a convolutional code (possibly tail biting) often provides the best performance. Consequently, fixed or predetermined allocations of transmission resources to control signaling and user data can lead to inefficient use of such resources as the optimal resource allocation will often depend on numerous factors, including the channel quality, the type of control signaling, and various other considerations.

The use of multiple transmit antennas can further complicate the allocation of transmission resources between control signaling and user data when the two types of information are multiplexed together on a common channel. When MIMO techniques are used to simultaneously transmit multiple data codewords in parallel, control signaling may be transmitted on multiple different codewords and/or layers of the transmission scheme. The optimal allocation of resources in such situations may differ from the optimal allocation under the same circumstances when a single transmission antenna is used. Moreover, the multiple-antenna technique used for control signaling may be different from that used for user data. Control signaling is often encoded for maximum robustness (e.g., with maximum transmission diversity) rather than for maximum throughput. By contrast, user data is often combined with a retransmission mechanism that allows for more throughput-aggressive multiple-antenna encoding techniques. Thus, if transmitter 100 has information indicating the supported payload of user data, transmitter 100 may not be able to assume the supported payload for control signaling is the same when determining the optimal allocation of transmission resources for control signaling. For example, the supported peak spectral efficiency of the encoded user data may be significantly larger than the supported peak spectral efficiency of the encoded control signaling.

In many circumstances, it may be desirable to determine the amount of transmission resources to use for each bit of control signaling based on the quality of the channel over which the multiplexed control signaling will be transmitted. As part of this process, transmitter 100 may estimate an inverse spectral efficiency for the user data to be transmitted, based on the data payloads of one or more of the user control codewords to be transmitted, and use this estimate to determine the amount of transmission resources to use for each bit of control signaling. In such situations, it may be acceptable for transmitter 100 to determine the amount of transmission resources to devote to each bit of control signaling using an estimated spectral efficiency for user data without accounting for the fact that some of the transmission resources will ultimately be allocated to control signaling.

While this manner of allocating may be acceptable in many situations, the impact that neglecting the control signaling has on this estimate can become significant when a large amount of control signaling must be transmitted. Consequently, the effectiveness of the resulting allocation may be greatly diminished. Specifically, this may result in an extremely pessimistic estimate of the inverse spectral efficiency for user data, causing transmission resources to be significantly over-allocated to control signaling. The result may be especially detrimental as the amount of control signaling increases to satisfy the requirements of advanced communication technologies, such as LTE-Advanced. As the amount of control signaling increases, control overhead may, in effect, grow approximately quadratic with the control payload, rather than linearly.

To address this problem, particular embodiments of transmitter 100 determine an allocation of transmission resources per bit of control codeword 120 that takes into consideration the amount of control signaling to be transmitted under the allocation. More specifically, particular embodiments of transmitter 100 estimate the inverse spectral efficiency supported by the current multi-layer encoding scheme to determine an appropriate allocation of transmission resources between user data and control signaling. As part of estimating the spectral efficiency, transmitter 100 estimates the amount of transmission resources to be allocated to user data, and in doing so, considers the amount of transmission resources that transmitter 100 would allocate to control signaling given the estimated inverse spectral efficiency that would result in actuality from this user data allocation. Transmitter 100 may then transmit the relevant control signaling using an amount of transmission resources that corresponds to this estimated spectral efficiency.

Turning to the example embodiment illustrated by FIG. 1, transmitter 100, in operation, generates or receives control codewords and data codewords (represented, in FIG. 1, by control codeword 120 and data codewords 122a and 122b, respectively) for transmission to a receiver over a radio channel. To permit multiplexing of control codewords 120 and data codewords 122 over a common channel, splitter 102 splits control codeword 120 for use by multiple channel interleavers 104. Splitter 102 may split control codeword 120 in any appropriate manner between channel interleavers 104, outputting a complete copy or some suitable portion on each datapath. As one example, splitter 102 may split control codeword 120 for use in the multiple datapaths by replicating control codeword 120 on both datapaths, outputting a complete copy of control codeword 120 to each channel interleaver 104. As another example, splitter 102 may split control codeword 120 by performing serial-to-parallel conversion of control codeword 120, outputting a unique portion of control codeword 120 to each channel interleaver 104.

Channel interleavers 104 each interleave a data codeword 122 with control codeword 120 (a complete copy of control codeword 120, a particular portion of control codeword 120, or some combination of both). Channel interleavers 104 may be configured to interleave data codewords 122 and control codeword 120 so that layer mapper 110 will map them to vector symbols in a desired manner. The interleaved outputs of channel interleavers 104 are then scrambled by scramblers 106 and modulated by symbol modulators 108.

The symbols output by symbol modulators 108 are mapped to transmission layers by layer mapper 110. Layer mapper 110 outputs a series of vector symbols 124 that are provided to carrier modulator 112. As an example, for embodiments of transmitter 100 that support LTE, each vector symbol 124 may represent an associated group of modulation symbols that are to be transmitted simultaneously on different transmission layers. Each modulation symbol in a particular vector symbol 124 is associated with a specific layer over which that modulation symbol will be transmitted.

After layer mapper 110 maps the received symbols into vector symbols 124, carrier modulator 112 modulates information from the resulting vector symbols 124 onto a plurality of radiofrequency (RF) subcarrier signals. Depending on the communication technologies supported by transmitter 100, carrier modulator 112 may also process the vector symbols 124 to prepare them for transmission, such as by precoding vector symbols 124. The operation of an example embodiment of carrier modulator 112 for LTE implementations is described in greater detail below with respect to FIG. 2. After any appropriate processing, carrier modulator 112 then transmits the modulated subcarriers over a plurality of transmission antennas 114.

As explained above, proper allocation of transmission resources to control signaling and user data may have a significant impact on the performance of transmitter 100. In particular embodiments, this allocation of transmission resources is reflected in the number of vector symbols 124 transmitter 100 uses to transmit control codewords 120 (such vector symbols referred to herein as "control vector symbols"). Transmitter 100 may determine the number of vector symbols 124 to use for a particular control codeword 120 based on a measure of the quality of the channel or some other indication of the likelihood that the receiver will erroneously detect control codeword 120 after being transmitted over the radio channel.

In particular, certain embodiments of transmitter 100 may use the data payload of the multiple layers or codewords that will be used to transmit control codewords 120 (or a subset of such layers/codewords) to estimate the inverse spectral efficiency currently supported by the multi-layer encoding scheme to be used. In particular embodiments, transmitter 100 determines a data payload for the multiple layers or codewords based on information included in a scheduling grant received by transmitter. Such information may include any suitable information from which transmitter 100 can directly or indirectly determine the data payload to be used for the multiple layers or codewords. For example, transmitter 100 may receive a scheduling grant that includes a total resource allocation, a coding rate, and a modulation scheme, and may determine from this information, the data payload of the transmission layers transmitter 100 will be using for the transmission. Using the determined payload, transmitter 100 may then determine an estimate of the spectral efficiency for the current allocation.

Additionally, the estimate of the inverse spectral efficiency used by transmitter 100 to determine the number of control vector symbols 124 may itself depend, in turn, on the number of control vector symbols 124 that would result from the estimate. Transmitter 100 may determine the inverse spectral efficiency estimate and the corresponding number of control vector symbols 124 in any suitable manner. In particular embodiments, transmitter 100 may determine the number of control vector symbols 124 based on a value Q' that is determined recursively, using a formula of the form:

$$Q' = f\left(\hat{Q}_{data}(Q'), \sum_{r=0}^{C_{n,0}-1} K_{0,r}, \ldots, \sum_{r=0}^{C_{n,N_{CW}}-1} K_{N_{CW}-1,r}, \beta_{offset}, O\right) \quad \text{Equation (1)}$$

where $$f\left(\hat{Q}_{data}(Q'), \sum_{r=0}^{C_{n}-1} K_{0,r}, \ldots, \sum_{r=0}^{C_{n}-1} K_{N_{CW}-1,r}\right)$$

represents a function that, given an estimate of the number of vector symbols 124 that will be allocated to transmitting user data codewords 122 ($\hat{Q}_{data}(Q')$) (such vector symbols referred to herein as "user data vector symbols") maps the data payloads $$\left(\sum_{r=0}^{C_{n}-1} K_{n,r}\right)$$

of each of the $N_{CW}$ user data codewords 122 into an estimate of the number of vector symbols 124 to be used for each bit of the control codewords 120 to be transmitted during the subframe. In Equation (1), $K_{q,r}$ represents the number of bits in an r-th code block of a q-th codeword of user data to be transmitted during the subframe with r≥1 and q≥1, $C_{n,m}$ is a number of code blocks in an m-th codeword of user data with m≥1, $N_{CW}$ is a number of codewords of control information to be transmitted during the subframe, O is a number of bits in one or more control codewords 120 to be transmitted during the subframe. If cyclic redundancy check (CRC) bits are used with user data codewords and/or control codewords, the relevant values for $K_{q,r}$ and/or O may include any CRC bits in their totals. As suggested by the designated ranges of r (r≥1) and q (q≥1) for the above formula, transmitter 100 may perform this calculation using one or more code blocks from one or more codewords of user data. Because, in Equation (1), the value of $\hat{Q}_{data}$ depends on the value of Q', the inverse spectral efficiency utilized to determine the allocation of control vector symbols 124 will be based on the number of control vector symbols 124 that would actually result from such an allocation (or an improved estimate thereof).

In certain embodiments, transmitter 100 may specifically use a formulation of $\hat{Q}_{data}$ (Q') that can be expressed in terms of a value ($Q_{all}$) indicating the total amount of transmission resources allocated to transmitter 100. The size and units of $Q_{all}$ depends on the manner in which the access network allocates transmission resources to transmitter 100. For instance, transmitter 100 may use a value of $Q_{all}=N \times M$, where N is the total number of vector symbols available to transmitter 100 for transmitting control information and user data in the relevant subframe (e.g., $N_{symb}^{PUSCH\text{-}initial}$ in certain LTE embodiments), and M is a total number of subcarriers available to transmitter 100 during the relevant subframe (e.g., $M_{sc}^{PUSCH\text{-}initial}$). In such embodiments, transmitter 100 may specifically use a formulation of $\hat{Q}_{data}$ (Q') that can be expressed as: $\hat{Q}_{data}=Q_{all}-\alpha Q'$, for some value of a, including but not limited to α=1.

As shown by Equation 1, transmitter 100 may utilize a configurable offset ($\beta_{offset}^{PUSCH}$) to scale or otherwise adjust the estimated number of vector symbols 124 to be used for control signaling. (Note that in this context there is a linear ambiguity between f(·) and $\beta_{offset}^{PUSCH}$, in that a constant scaling can be absorbed either by f(·) or by $\beta_{offset}^{PUSCH}$; that is, the pair $\lfloor f(\cdot), \beta_{offset}^{PUSCH} \rfloor$, is considered equivalent to the pair $\lfloor \hat{f}(\cdot), \tilde{\beta}_{offset}^{PUSCH} \rfloor$, where $\hat{f}(\cdot)=f(\cdot)/c$, and $\tilde{\beta}_{offset}^{PUSCH}=c \cdot \beta_{offset}^{PUSCH}$.) Additionally, as also indicated by Equation 1, particular embodiments of transmitter 100 may use a maximum threshold ($Q_{max}'$) to limit the maximum amount of transmission resources that may be allocated to control codewords 120 for the subframe. Furthermore, as indicated by the $\lfloor \; \rfloor$ operator in Equation 1, particular embodiments of transmitter 100 may round, truncate, or otherwise map the estimated (or scaled) number of control vector symbols 124 to an integer value, such as by applying the ceiling operator to the scaled value as shown.

Because of the interdependency between the number of control vector symbols 124 and the estimated inverse spectral efficiency for user data (as reflected by the number of vector symbols 124 allocated to user data), particular embodiments of transmitter 100 may be unable to determine the number of control vector symbols 124 using a closed-form expression. As a result, particular embodiments of transmitter 100 may determine the number of control vector symbols 124 using a recursive algorithm to solve Equation (1). Alternatively, such embodiments of transmitter 100 may determine a numerical value for Q' and, based on Q', a number of control vector symbols 124 to allocate, transmitter 100 by solving a modified version of Equation (1) and determining the smallest Q' for which:

$$Q' \geq f\left(\hat{Q}_{data}(Q'), \sum_{r=0}^{C_{n,0}-1} K_{0,r}, \ldots, \sum_{r=0}^{C_{n,N_{CW}}-1} K_{N_{CW}-1,r}, \beta_{offset}, O\right) \quad \text{Equation (2)}$$

Alternative embodiments of transmitter 100 may determine the number of control vector symbols 124 to allocate using a value of Q' defined by a closed-form expression that takes the control overhead into account. This closed-form expression may represent any suitable expression in which the estimated number of user data vector symbols 124 to be allocated has a relationship to the number of control vector symbols 124 to be allocated that can be entirely expressed in terms of other values.

As one example of such a closed-form expression, particular embodiments of transmitter 100 may use an estimate for the number of user data vector symbols 124 whose dependency on the number of control vector symbols 124 to be allocated can be expressed in terms of the size (O) of the control codewords 120 to be transmitted. For example, transmitter 100 may use a version of f( ) in which:

$$f\left(\hat{Q}_{data}(Q'), \sum_{r=0}^{C_{n,0}-1} K_{0,r}, \ldots , \sum_{r=0}^{C_{n,N_{CW}}-1} K_{N_{CW}-1,r}, \beta_{offset}^{PUSCH}, O\right) = \frac{Q_{all} - Q'}{g\left(\sum_{r=0}^{C_{n,0}-1} K_{0,r}, \ldots , \sum_{r=0}^{C_{n,N_{CW}}-1} K_{N_{CW}-1,r}\right)} O \cdot \beta_{offset}$$

Equation (3)

In such embodiments, Q' can be obtained in closed form as:

$$Q' = \frac{Q_{all}}{g\left(\sum_{r=0}^{C_{n,0}-1} K_{0,r}, \ldots , \sum_{r=0}^{C_{n,N_{CW}}-1} K_{N_{CW}-1,r}\right) + O\beta_{offset}} O \cdot \beta_{offset},$$

Equation (4)

where the nominal inverse spectral efficiency estimate:

$$\frac{Q_{all}}{g\left(\sum_{r=0}^{C_{n,0}-1} K_{0,r}, \ldots , \sum_{r=0}^{C_{n,N_{CW}}-1} K_{N_{CW}-1,r}\right) + O\beta_{offset}}$$

depends on O and $\beta_{offset}$.

After calculating a nominal number of control vector symbols 124 to allocate using any of the techniques described above, transmitter 100 may process this nominal value from the above algorithms (e.g., the value Q') as appropriate to ensure a certain type of final value or a final value in a particular range. Transmitter 100 may then use the nominal number, or the result of any such processing, to determine a number of vector symbols 124 to allocate to control information. For example, transmitter 100 may convert Q' to an integer-valued result (e.g., using a ceiling function) or may set a minimum and/or maximum for Q' to ensure that the number of allocated control vector symbols 124 is within a particular range. Alternatively, transmitter 100 may process any of the individual inputs used by the above algorithms (e.g., the estimated inverse spectral efficiency of user data) as appropriate to ensure a suitable type or range for the resulting output. As one specific example, transmitter 100 may utilize a minimum threshold for the inverse spectral efficiency of user data to ensure that the resulting number of vector symbols 124 allocated to each bit of control signaling is greater than a minimum amount. Thus, in particular embodiments, transmitter 100 may calculate the number of data vectors (Q') to allocate for transmission of a particular control signal using a minimum inverse spectral efficiency value ($K_{min}$) such that:

$$Q' = O \cdot \beta_{offset} \cdot \max\left(\frac{Q_{all} - Q'}{g\left(\sum_{r=0}^{C_{n,0}-1} K_{0,r}, \ldots , \sum_{r=0}^{C_{n,N_{CW}}-1} K_{N_{CW}-1,r}\right)}, K_{min}\right)$$

Equation (5)

Equation (5) can be rewritten to show that in such embodiments:

$$Q' = O \cdot \beta_{offset} \cdot \max\left(\frac{Q_{all}}{g\left(\sum_{r=0}^{C_{n,0}-1} K_{0,r}, \ldots , \sum_{r=0}^{C_{n,N_{CW}}-1} K_{N_{CW}-1,r}\right) + O\beta_{offset}}, K_{min}\right)$$

By utilizing a minimum threshold for the inverse spectral efficiency, transmitter 100 can ensure that the per-bit allocation to a particular control signal does not fall below a specific level regardless of the quality of the transmission channel.

Additionally, particular embodiments of transmitter 100 may utilize a compensation offset parameter, on its own or in conjunction with a default offset parameter (such as the $\beta_{offset}$ parameter discussed above) to improve the spectral efficiency estimation for large control signaling payloads. For example, transmitter 100 may estimate a nominal inverse spectral efficiency based on a compensation offset parameter ($\tilde{\beta}_{offset}$) using the formula:

$$\frac{Q_{all}}{g\left(\sum_{r=0}^{C_{n,0}-1} K_{0,r}, \ldots , \sum_{r=0}^{C_{n,N_{CW}}-1} K_{N_{CW}-1,r}\right) + O\tilde{\beta}_{offset}}$$

Thus, in such embodiments, transmitter 100 may allocate a number of vector symbols 124, Q', to a control signal, such that:

$$Q' = O \cdot \beta_{offset} \cdot \frac{Q_{all}}{g\left(\sum_{r=0}^{C_{n,0}-1} K_{0,r}, \ldots , \sum_{r=0}^{C_{n,N_{CW}}-1} K_{N_{CW}-1,r}\right) + O\tilde{\beta}_{offset}}.$$

In some embodiments, use of a compensation offset parameter by transmitter 100 may be configurable by other elements of the communication network in which transmitter 100 is operating, such as an eNodeB when transmitter 100 represents a UE. In particular embodiments, a serving eNodeB or other node of the network may activate or deactivate large uplink control information (UCI) compensation in transmitter 100, and thereby activate or deactivate use of the compensation offset parameter by transmitter 100. For example, the serving eNodeB may transmit downlink control information instructing transmitter 100 to activate or deactivate large UCI compensation, and transmitter 100 may adjust its use of the compensation offset parameter accordingly.

Additionally, while particular embodiments of transmitter 100 may use a predetermined compensation offset parameter, alternative embodiments may receive the value of the compensation offset parameter from other elements of the communication network. For example, a serving eNodeB may transmit a compensation offset parameter to transmitter 100 and transmitter 100 may then use the received compensation offset parameter as described above. As a result, other elements of the communication network can configure the aggressiveness of the large UCI compensation performed by transmitter 100. Furthermore, by permitting elements such as the serving eNodeB to adjust the transmitter's use of large UCI compensation, such embodiments can configure transmitter 100 to operate consistent with assumptions made by those elements when allocating transmission resources to transmitter 100.

Thus, transmitter 100 may provide improved resource allocation techniques in a variety of different forms. Using these resource allocation techniques, certain embodiments of transmitter 100 may be able to match the allocation of control-signaling transmission resources to the quality of the relevant radio channel and to account for the use of multiple codewords or layers in making the allocation. Additionally, certain embodiments accurately account for the amount of transmission resources that will be used for control signaling when estimating the supported inverse spectral efficiency of the transmission channel, resulting in a more accurate estimate and, thus, an improved allocation. As a result, such embodiments may reduce the amount of overhead used to transmit control signaling when the control signaling is multiplexed with user data. Consequently, certain embodiments of transmitter 100 may provide multiple operational benefits. Specific embodiments, however, may provide some, none, or all of these benefits.

Figure 5:
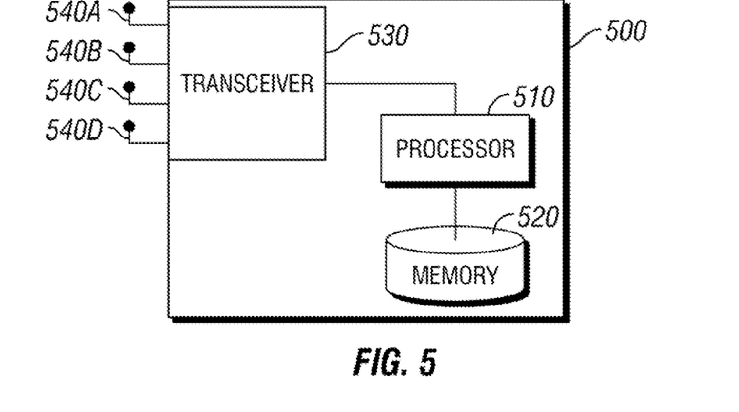
FIG. 5 is a structural block diagram showing the contents of a network node that is responsible for receiving and/or scheduling transmissions of the transmitter.
Figure 6:
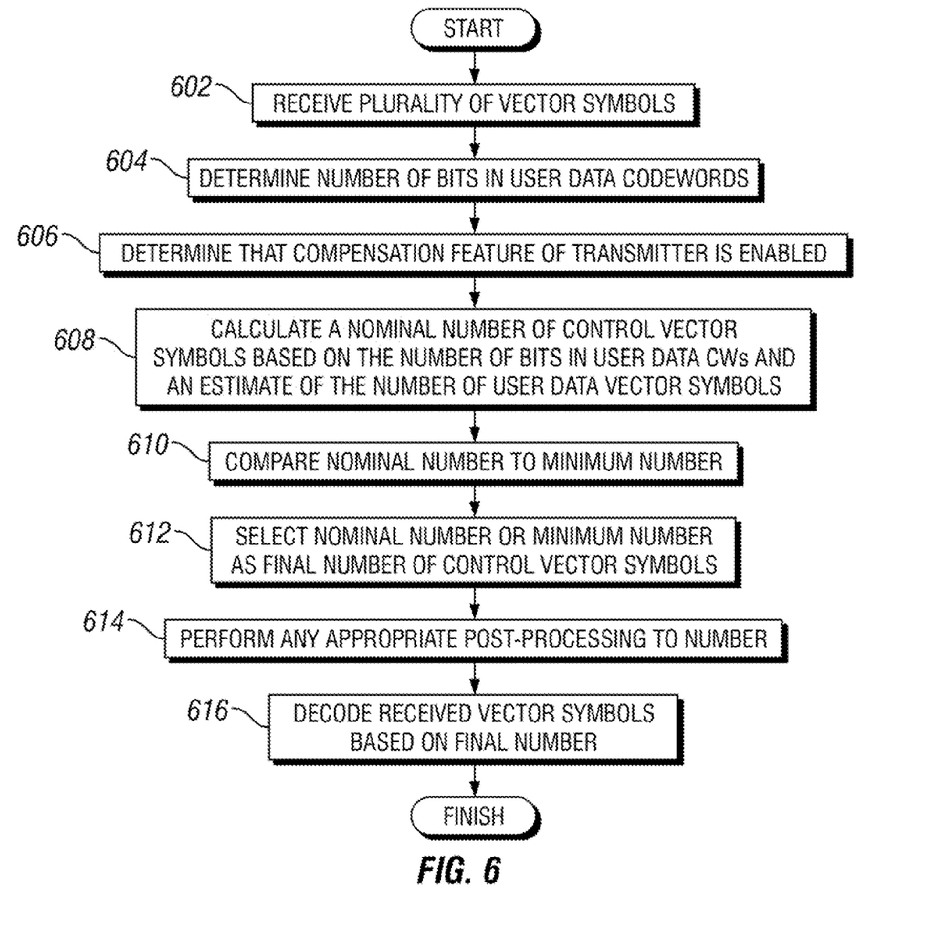
FIG. 6 is a flowchart showing example operation of a particular embodiment of the network node of FIG. 5 in receiving transmissions from the transmitter.
Figure 7:
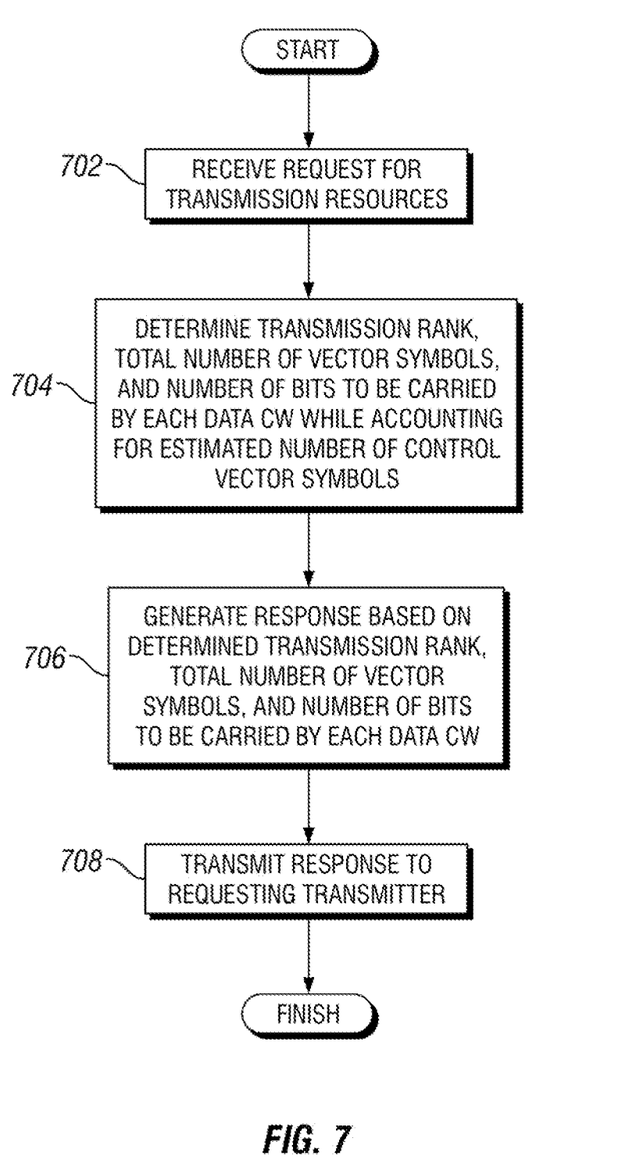
FIG. 7 is a flowchart showing example operation of a particular embodiment of the network node in scheduling transmissions of the transmitter.

Although the description above focuses on implementation of the described resource allocation techniques in a transmitter, the above concepts can also be applied at a receiver. For example, when decoding transmissions received from transmitter 100, a receiver may utilize certain aspects of the described techniques to estimate the amount of transmission resources that have been allocated to control signaling. Furthermore, the described concepts may be applied for purposed of scheduling use of transmission resources in wireless communication systems that utilize centralized resource management. For example, an eNode B may utilize certain aspects of the described techniques to estimate the amount of transmission resources a UE that incorporates transmitter 100 will allocate to control signaling for a given period of time or for a given amount of transmitted data. Based on this estimate, the eNode B may determine an appropriate number of transmission resources to schedule for use by the relevant UE. FIGS. 5-7 describe in greater detail the contents and operation of example devices capable of performing such receiving and/or scheduling. Additionally, although the description herein focuses on implementation of the described resource allocation techniques in wireless communication networks supporting LTE, the described resource allocation techniques may be utilized in conjunction with any appropriate communication technologies including, but not limited to LTE, High-Speed Packet Access plus (HSPA+), and Worldwide Interoperability for Microwave Access (WiMAX).

Figure 2:
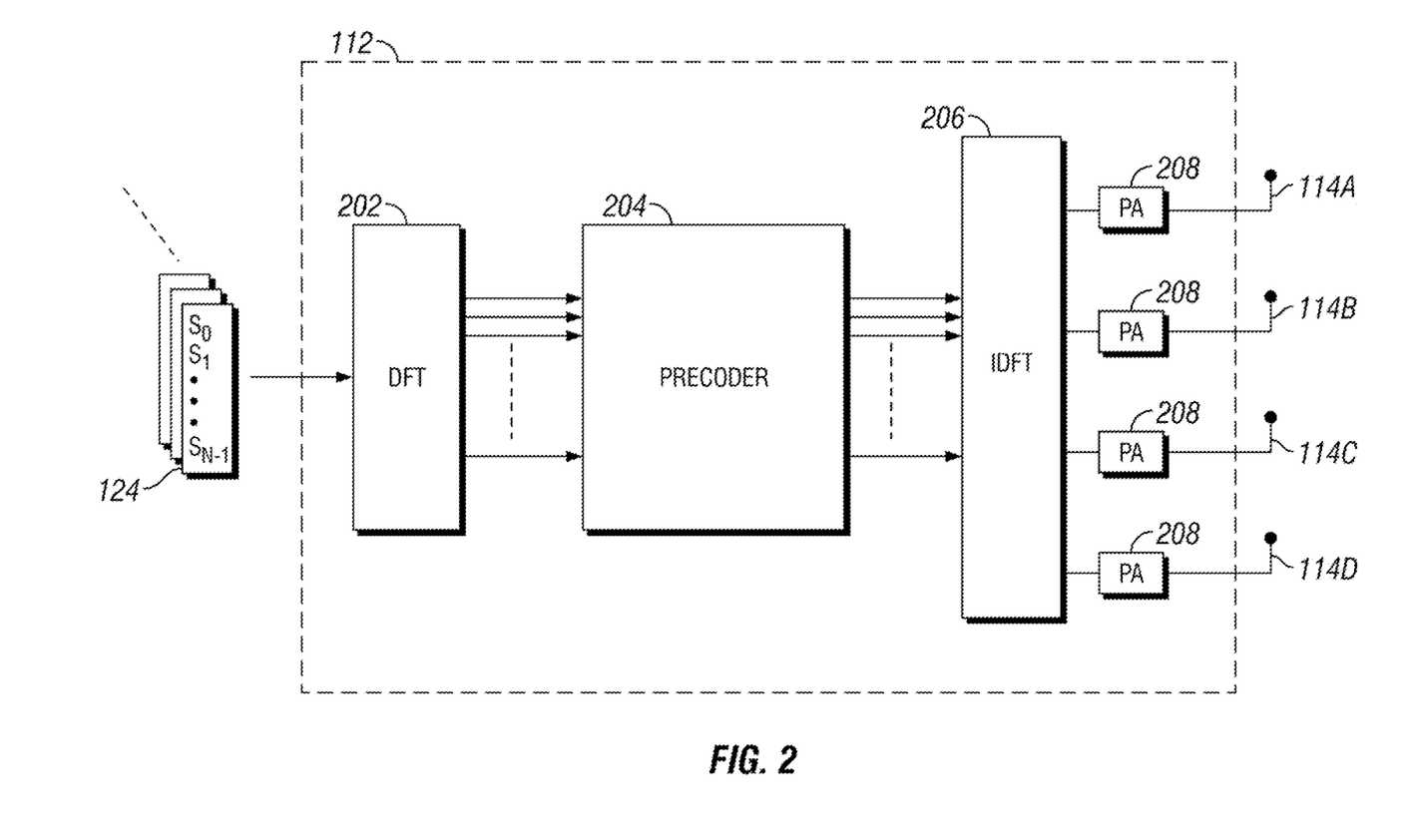
FIG. 2 is a functional block diagram illustrating a particular embodiment of a carrier modulator that may be used in the transmitter of FIG. 1.

FIG. 2 is a functional block diagram showing in greater detail the operation of a particular embodiment of carrier modulator 112. In particular, FIG. 2 illustrates an embodiment of carrier modulator 112 that might be used by an embodiment of transmitter 100 that utilizes DFTS-OFDM as required for uplink transmissions in LTE. Alternative embodiments may be configured to support any other appropriate type of carrier modulation. The illustrated embodiment of carrier modulator 112 includes a DFT 202, a precoder 204, an inverse DFT (IDFT) 206, and a plurality of power amplifiers (PAs) 208.

Carrier modulator 112 receives vector symbols 124 output by layer mapper 110. As received by carrier modulator 112, vector symbols 124 represent time domain quantities. DFT 202 maps vector symbols 124 to the frequency domain. The frequency-domain version of vector symbols 124 are then linearly precoded by precoder 204 using a precoding matrix, W, that is ($N_T \times r$) in size, where $N_T$ represents the number of transmission antennas 114 to be used by transmitter 100 and r represents the number of transmission layers that will be used by transmitter 100. This precoder matrix combines and maps the r information streams onto $N_T$ precoded streams. Precoder 204 then generates a set of frequency-domain transmission vectors by mapping these precoded frequency-domain symbols onto a set of sub-carriers that have been allocated to the transmission.

The frequency-domain transmission vectors are then converted back to the time domain by IDFT 206. In particular embodiments, IDFT 206 also applies a cyclic prefix (CP) to the resulting time-domain transmission vectors. The time-domain transmission vectors are then amplified by power amplifiers 208 and output from carrier modulator 112 to antennas 114, which are used by transmitter 100 to transmit the time-domain transmission vectors over a radio channel to a receiver.

Figure 3:
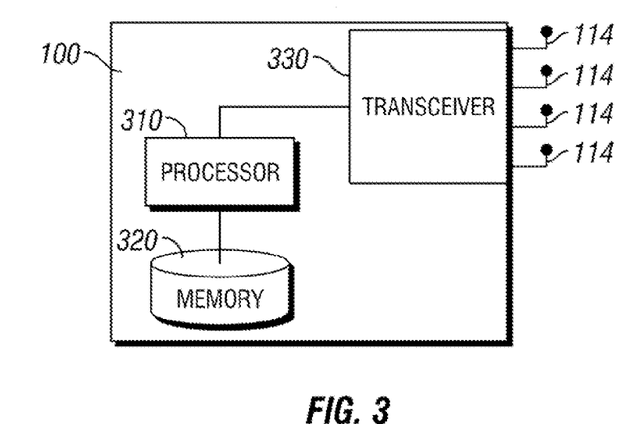
FIG. 3 is a structural block diagram showing the contents of a particular embodiment of the transmitter.

FIG. 3 is a structural block diagram showing in greater detail the contents of a particular embodiment of transmitter 100. Transmitter 100 may represent any suitable device capable of implementing the described resource allocation techniques in wireless communication. For example, in particular embodiments, transmitter 100 represents a wireless terminal, such as an LTE user equipment (UE). As shown in FIG. 3, the illustrated embodiment of transmitter 100 includes a processor 310, a memory 320, a transceiver 330, and a plurality of antennas 114.

Processor 310 may represent or include any form of processing component, including dedicated microprocessors, general-purpose computers, or other devices capable of processing electronic information. Examples of processor 310 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of transmitter 100 that includes a single processor 310, transmitter 100 may include any number of processors 310 configured to interoperate in any appropriate manner. In particular embodiments, some or all of the functionality described above with respect to FIGS. 1 and 2 may be implemented by processor 310 executing instructions and/or operating in accordance with its hardwired logic.

Memory 320 stores processor instructions, equation parameters, resource allocations, and/or any other data utilized by transmitter 320 during operation. Memory 320 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3, memory 320 may include one or more physical components local to or remote from transmitter 100.

Transceiver 330 transmits and receives RF signals over antennas 340a-d. Transceiver 330 may represent any suitable form of RF transceiver. Although the example embodiment in FIG. 3 includes a certain number of antennas 340, alternative embodiments of transmitter 100 may include any appropriate number of antennas 340. Additionally, in particular embodiments, transceiver 330 may represent, in whole or in part, a portion of processor 310.

Figure 4:
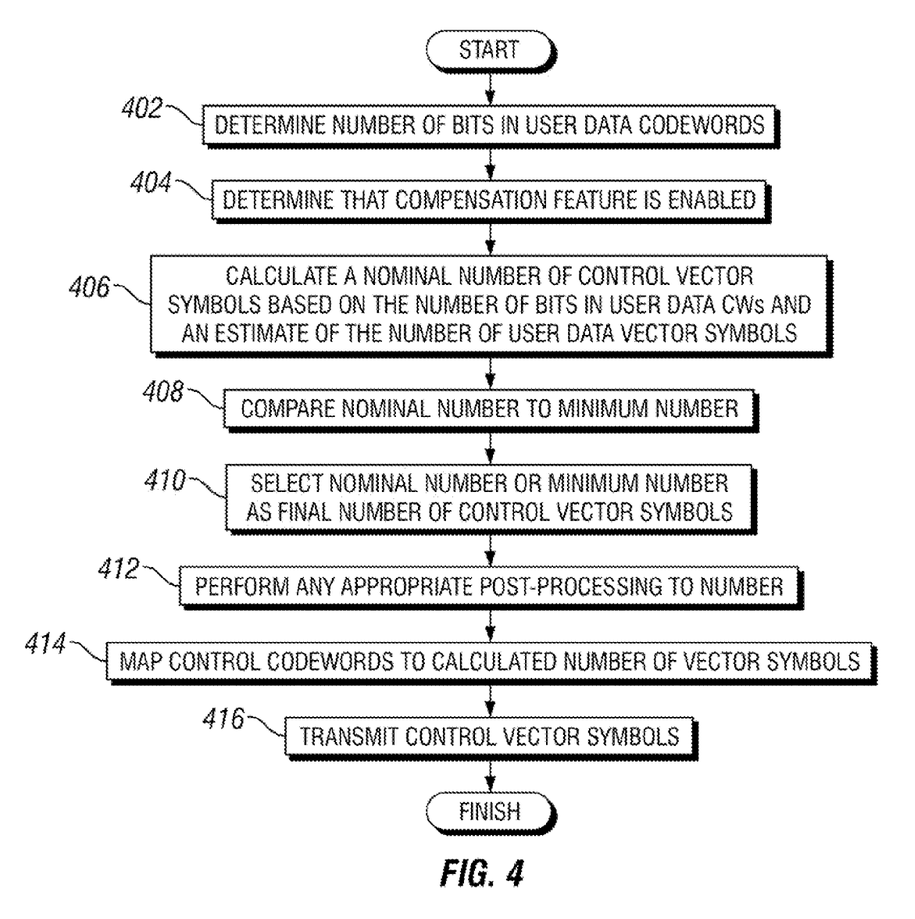
FIG. 4 is a flowchart detailing example operation of a particular embodiment of the transmitter.

FIG. 4 is a flowchart detailing example operation of a particular embodiment of transmitter 100. In particular, FIG. 4 illustrates operation of an embodiment of transmitter 100 in allocating transmission resources to the transmission of control codewords 120. The steps illustrated in FIG. 4 may be combined, modified, or deleted where appropriate. Additional steps may also be added to the example operation. Furthermore, the described steps may be performed in any suitable order.

Operation begins at step 402 with transmitter 100 determining a number of bits in one or more user data codewords 122 to be transmitted during a subframe. In particular embodiments, user data codewords 122 may include CRC bits, and transmitter 100 may consider these CRC bits when counting the bits in the relevant user data codewords 122. Additionally, in particular embodiments, the plurality of user data codewords counted by transmitter 100 may represent all of the user data codewords 122 to be transmitted during the subframe or only a subset of those user data codewords 122. For example, in certain embodiments, transmitter 100 may determine the number of bits in step 402 based only on the user data codewords 122 to be transmitted on certain transmission layers.

In particular embodiments, transmitter 100 may be configured to selectively utilize the techniques described above to provide more accurate estimates of the optimal allocation for control signaling. For example, in particular embodiments, transmitter 100 may utilize the above described techniques when a compensation feature of transmitter 100 has been activated (e.g., as a result of instructions from a serving base station). Therefore, in such embodiments, transmitter 100 may determine whether a compensation feature of transmitter 100 is activated as part of allocating vector symbols to user data and control signaling. For the illustrated example, it is assumed that transmitter 100 determines that the compensation feature is activated as shown at step 404. Because the compensation feature is activated, transmitter 100 will then use the resource allocation techniques described above, rather than an alternative allocation technique that does not account for the effect of control signaling allocation on the available resources for transmitting user data.

At step 406, transmitter 100 then uses the number of bits of user data codewords 122 to be transmitted during the subframe to calculate a number of vector symbols 124 to allocate to control information. As discussed above, transmitter 100 also bases this calculation in part on an estimate of the number of user data vector symbols onto which the user data codewords 122 will be mapped (e.g., as reflected by an estimated inverse spectral efficiency for user data). In particular embodiments, the number of user data vector symbols depends on the number of control vector symbols that would result if the calculated number of user data vector symbols were in actuality allocated to the transmission of user data.

For the purposes of the example in FIG. 4, transmitter 100 calculates a number of control vector symbols equal to Q' such that:

$$Q' = f\left(\hat{Q}_{data}(Q'), \sum_{r=0}^{C_{n,0}-1} K_{0,r} \ldots \sum_{r=0}^{C_{n,N_{CW}}-1} K_{N_{CW}-1,r}, O\right).$$

As discussed above, transmitter 100 may estimate the number of vector symbols 124 to be allocated to user data codewords 122 in any suitable manner including, but not limited to, using any of the formulations of $\hat{Q}_{data}$ discussed above. Because Q' is a function of $\hat{Q}_{data}$, which itself depends on Q', in particular embodiments, transmitter 100 may solve for Q' and $\hat{Q}_{data}$ recursively. Alternatively, transmitter 100 may utilize a formulation of $\hat{Q}_{data}$ that permits Q' to be expressed in a closed form, and thereby enables transmitter 100 to solve for Q' explicitly. For example, as part of step 406, transmitter 100 may estimate $\hat{Q}_{data}$ as:

$$\hat{Q}_{data}(Q') = Q_{all} - \frac{\tilde{\beta}_{offset}}{\beta_{offset}} Q',$$

where $\beta_{offset}$ is a first offset value that can be used to adjust a target block error rate (BLER) for control information transmitted using the resulting allocation and $\tilde{\beta}_{offset}$ is a second offset value that can be used to adjust the aggressiveness of the control information compensation. As a result, transmitter 100 may use $\hat{Q}_{data}$ to calculate a value for Q' such that:

$$Q' = \frac{Q_{all} \times O}{g\left(\sum_{r=0}^{C_{n,0}-1} K_{0,r} \ldots \sum_{r=0}^{C_{n,N_{CW}}-1} K_{N_{CW}-1,r}\right) + O\tilde{\beta}_{offset}} \times \beta_{offset}$$

In particular embodiments, Q' may represent a nominal number of control vector symbols, and transmitter 100 may apply certain additional processing steps to this nominal number of control vector symbols to produce an appropriate final number of control vector symbols 124 for the transmission. For example, the illustrated embodiment of transmitter 100 compares the nominal number of control vector symbols 124 to a minimum number that transmitter 100 is configured to use in transmitting control codewords 120 at step 408. This minimum number of control vector symbols 124 may be a generic minimum threshold applied to all control codeword 120 transmissions or may be a minimum determined by transmitter 100 for this specific transmission (for example, based on the payload of the control codewords 120 to be transmitted). Transmitter 100 may then select the greater of the nominal calculated number and the minimum number as the number of vector symbols 124 to allocate to control information, as shown at step 410.

In addition, or as an alternative, to ensuring a minimum allocation, transmitter 100 may be configured to perform any other appropriate post-processing to the nominal number of vector symbols 124, such as converting the nominal number to an integer value (e.g., by applying a ceiling operation) or otherwise increasing or decreasing the nominal number to ensure a final number within a certain range, as represented by step 412. Transmitter 100 may then use the nominal number or the output of any additional post-processing as the final number of vector symbols 124 to allocate to control signaling.

After determining the final number of vector symbols 124 to allocate to control signaling, transmitter 100 then maps control codewords 120 available for transmission to the calculated final number of vector symbols 124 at step 414. Transmitter 100 may perform any appropriate processing of the control vector symbols 124 to permit transmission of the control vector symbols 124 to a receiver in communication with transmitter 100 including, for example, the processing described above with respect to FIG. 2. After completing any appropriate processing of vector symbols 124, transmitter 100 then transmits control vector symbols 124 over a plurality of transmission layers using the plurality of antennas 114 at step 416. Operation of transmitter 100 with respect to transmitting these particular control codewords 120 may then end as shown in FIG. 4.

FIG. 5 is a structural block diagram showing the contents of a network node 500 that may serve as a receiver for control codewords 120 transmitted by transmitter 100 and/or that may serve as a scheduler for scheduling transmission of control codewords 120 by transmitter 100. As noted above, the described resource allocation techniques may also be utilized by devices in decoding transmissions received from transmitter 100 or in determining the appropriate amount of transmission resources to schedule for use by transmitter 100 in a given subframe. For example, in particular embodiments, transmitter 100 may represent a wireless terminal (such as an LTE UE) and network node 500 may represent an element of a radio access network that receives uplink transmission from the wireless terminal or that is responsible for scheduling the wireless terminal's use of transmission resources (such as an LTE eNodeB).

As shown in FIG. 5, the illustrated embodiment of network node 500 includes a processor 510, a memory 520, a transceiver 530, and a plurality of antennas 540*a-d*. Processor 510, memory 520, transceiver 530, and antennas 540 may represent identical or analogous elements to the similarly-named elements of FIG. 3. In particular embodiments of network node 500, some or all of the functionality of network node 500 described below with respect to FIGS. 6 and 7 may be implemented by processor 510 executing instructions and/or operating in accordance with its hard-wired logic.

FIG. 6 is a flowchart detailing example operation of a particular embodiment of network node 500. In particular, FIG. 6 illustrates operation of an embodiment of network node 500 in receiving and decoding control codewords 120 received from transmitter 100. The steps illustrated in FIG. 6 may be combined, modified, or deleted where appropriate. Additional steps may also be added to the example operation. Furthermore, the described steps may be performed in any suitable order.

Operation of network node 500 begins at step 602 with network node 500 receiving a plurality of vector symbols 124 from transmitter 100. For purposes of decoding the vector symbols 124, network node 500 may need to determine the manner in which transmitter 100 allocated these vector symbols 124 between control signaling and user data. As a result, network node 500 may determine the number of the received vector symbols 124 that transmitter 100 used to transmit control codewords 120.

To properly decode the received vector symbols 124, network node 500 may need to follow the same or an analogous procedure to what transmitter 100 used to determine the resource allocation on the transmitting side. Thus, depending on the configuration of the relevant transmitter 100, network node 500 may be configured to determine the number of vector symbols 124 allocated to control codewords 120 (referred to herein as "control vector symbols") using any of the techniques described above. An example of this process for the example embodiment is shown at steps 604-608 of FIG. 6. In particular, FIG. 6 describes operation of an embodiment of network node 500 that communicates with the transmitter 100 described by FIGS. 1-3. Thus, network node 500 performs steps 604-614 in a similar or analogous fashion to that described above for the similarly-captioned steps in FIG. 3.

After network node 500 has determined the final number of vector symbols 124 that transmitter 100 allocated to control codewords 120, network node 500 decodes the received vector symbols 124 based on this number at step 616. For example, network node 500 may use this information to determine which of the received vector symbols 124 are carrying control codewords 120 and which are carrying user data codewords 122. If transmitter 100 has encoded control signaling and user data using different encoding schemes, network node 500 may then apply a different decoding scheme to the two types of vector symbols 124. Operation of network node 500 with respect to decoding the received symbol vectors may then terminate as shown in FIG. 6.

FIG. 7 is a flowchart detailing example operation of a particular embodiment of network node 500 responsible for scheduling the use of transmission resources by transmitter 100. The steps illustrated in FIG. 7 may be combined, modified, or deleted where appropriate. Additional steps may also be added to the example operation. Furthermore, the described steps may be performed in any suitable order.

In FIG. 7, operation of network node 500 begins at step 702 with network node 500 receiving a request for transmission resources from transmitter 100. This request may represent any appropriate information indicating network node 500 has information, including one or both of control signaling and user data, to transmit in a geographic area served by network node 500. In particular embodiments, network node 500 may represent an LTE eNodeB and this request may represent a scheduling request transmitted by transmitter 100 on PUCCH. Additionally, network node 500 may possess information regarding transmissions transmitter 100 is expected to make during the relevant subframe. For example, in the relevant subframe, transmitter may expect a HARQ ACK/NACK transmission from transmitter 100 responding to a previous transmission from network node 500. Alternatively or additionally, in particular embodiments, the scheduling request received by network node 500 may indicate the amount and/or type of information transmitter 100 is intending to transmit.

In response to receiving the request, network node 500 may determine an allocation of transmission resources to grant to transmitter 100 for use in transmitting the requested transmission. To determine this allocation, network node 500 may determine the amount of control information and user data network node 500 expects transmitter 100 to transmit in conjunction with the request. Network node 500 may determine these amounts based on information included in the request itself, information maintained locally by network node 500 itself (e.g., information on expected control information transmissions), and/or information received from any other suitable source.

Furthermore, in particular embodiments, network node 500 determines this overall allocation based on the assumption that transmitter 100 will determine an allocation for control vector symbols for the requested transmission based on the techniques described above. Thus, network node 500 may also use the techniques above to grant an appropriate amount of transmission resources to transmitter 100 for the requested transmission. Because the above techniques may involve transmitter 100 determining an allocation of control vector symbols that depends in part on the allocation of user data vector symbols, network node 500 may likewise estimate the control allocation based on an estimated allocation for user data. Furthermore, in determining a total allocation for transmitter 100, network node 500 may also account for the fact that, as described above, transmitter 100 will consider the resulting control vector symbol allocation when allocating vector symbols 124 to user data. This may result in network node 500 determining a total allocation for transmitter 100 comprised of a user data allocation and a control information allocation, which are dependent upon one another. Thus, in particular embodiments, network node 500 may determine the total allocation recursively. An example of this is shown by step 704 of FIG. 7.

Depending on the configuration of transmitter 100, network node 500 may process the estimated number of control vector symbols in an appropriate manner as described above before using the value to make the determination of step 704. For example, network node 500 may calculate a nominal number of control vector symbols based on the estimated number of data vector symbols, the estimated number of bits of control codewords 120, and the number of bits of user data to be carried by each of the user data codewords. Network node 500 may then scale this nominal number by an offset, increase the nominal number to meet a minimum number, apply a ceiling operation to the nominal, and/or perform any other appropriate processing to the nominal number to calculate the final estimated number of control vector symbols.

Network node 500 then uses this determination in responding to the request sent by transmitter 100. In particular embodiments, if network node 500 decides to grant the request, network node 500 may communicate aspects of the determined allocation to transmitter 100. Therefore, in particular embodiments, network node 500 may respond to the request by generating a particular response (e.g., a scheduling grant) to the request based on the determined allocation and transmitting the response to transmitter 100, as shown by steps 706-708 of FIG. 7. For example, in certain LTE embodiments, network node 500 may generate a scheduling grant that includes information indicating the determined transmission rank, the determined total number of vector symbols, and the number of bits to be used for each data codeword and send this scheduling grant to transmitter 100. Alternatively or additionally, network node 500 may use the determined allocation in deciding whether to grant the request or in deciding how to prioritize the request. Operation of network node 500 with respect to scheduling transmitter 100 for this subframe may then terminate as shown in FIG. 7.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for wirelessly transmitting data and control information using a plurality of transmission layers, comprising:
   determining a number of bits in one or more user data codewords to be transmitted during a subframe;
   calculating a number of control vector symbols to allocate to control information during the subframe, based at least in part, on:
   the number of bits in the one or more user data codewords, and
   an estimate of the number of user data vector symbols onto which the one or more user data codewords will be mapped, wherein the estimate of the number of user data vector symbols depends, at least in part, on the number of control vector symbols to be allocated to control information;
   mapping one or more control codewords to the calculated number of control vector symbols, wherein the one or more control codewords comprise encoded control information; and
   transmitting the user data vector symbols and the control vector symbols over a plurality of transmission layers during the subframe.

2. The method of claim 1, wherein calculating a number of control vector symbols comprises determining a number of control vector symbols based, at least in part, on a value (Q') wherein:

$$Q' = f\left(\hat{Q}_{data}(Q'), \sum_{r=0}^{C_{n,0}-1} K_{0,r} \ldots \sum_{r=0}^{C_{n,N_{CW}}-1} K_{N_{CW}-1,r}, O\right)$$

and wherein $K_{q,r}$ is a number of bits in an r-th code block of a q-th codeword of user data to be transmitted during the subframe for $r \geq 1$ and $q \geq 1$, $C_{n,m}$ is a number of code blocks in an m-th codeword of user data for $m \geq 1$, $N_{CW}$ is a number of the one or more control codewords, O is a number of bits in the one or more control codewords, and $\hat{Q}_{data}(Q')$ is an estimated number of vector symbols to be allocated to user data during the subframe and is dependent on the number of control vector symbols allocated to control information.

3. The method of claim 2, wherein determining the number of control vector symbols based, at least in part, on the value Q' comprises:
   determining a nominal number of control vector symbols to allocate to control information based, at least in part, on the value Q'; and
   determining a final number of control vector symbols by selecting the greater of the nominal number of control vector symbols and a minimum number of control vector symbols.

4. The method of claim 2, wherein determining the number of control vector symbols based, at least in part, on the value Q' comprises:
   determining a nominal number of control vector symbols to allocate to control information based, at least in part, on the value Q'; and
   determining a final number of control vector symbols by selecting the lesser of the nominal number of control vector symbols and a maximum number of control vector symbols.

5. The method of claim 2, wherein determining a number of control vector symbols based, at least in part, on the value Q' comprises:

determining a nominal number of control vector symbols to allocate to control information based, at least in part, on the value Q'; and determining a final number of control vector symbols by converting the nominal number of control vector symbols to an integer value.

6. The method of claim 2, wherein:

$$\hat{Q}_{data}(Q')=Q_{all}-\alpha \cdot Q',$$

wherein $Q_{all}$ indicates a total amount of transmission resources allocated to a transmitter, and $\alpha$ is a constant or a configurable parameter.

7. The method of claim 6, wherein $Q_{all}$ is equal to a total number of subcarriers allocated to the transmitter for transmitting user data and control information during the subframe multiplied by a total number of vector symbols allocated to the wireless terminal for transmitting user data and control information during the subframe.

8. The method of claim 2, wherein calculating the number of control vector symbols to allocate to control information based on Q' comprises selecting a smallest Q' for which:

$$Q' \geq f\left(\hat{Q}_{data}(Q'), \sum_{r=0}^{C_{n,0}-1} K_{0,r} \ldots \sum_{r=0}^{C_{n,N_{CW}}-1} K_{N_{CW}-1,r}, O\right).$$

9. The method of claim 2, wherein calculating the number of control vector symbols to allocate to control information comprises scaling a nominal number of control vector symbols by an offset ($\beta_{offset}$) to calculate a final number of control vector symbols, such that:

$$Q' = f\left(\hat{Q}_{data}(Q'), \sum_{r=0}^{C_{n,0}-1} K_{0,r} \ldots \sum_{r=0}^{C_{n,N_{CW}}-1} K_{N_{CW}-1,r}, O, \beta_{offset}\right).$$

10. The method of claim 9, wherein:

$$Q' = \frac{\hat{Q}_{data}(Q') \times O}{g\left(\sum_{r=0}^{C_{n,0}-1} K_{0,r} \ldots \sum_{r=0}^{C_{n,N_{CW}}-1} K_{N_{CW}-1,r}, O\right)}.$$

11. The method of claim 10, wherein $$\hat{Q}_{data}(Q') = Q_{all} - \frac{\tilde{\beta}_{offset}}{\beta_{offset}} Q',$$

such that:

$$Q' = \frac{Q_{all} \times O}{g\left(\sum_{r=0}^{C_{n,0}-1} K_{0,r} \ldots \sum_{r=0}^{C_{n,N_{CW}}-1} K_{N_{CW}-1,r}\right) + O\tilde{\beta}_{offset}} \times \beta_{offset},$$

wherein $Q_{all}$ indicates a total amount of transmission resources allocated to a transmitter, and $\tilde{\beta}_{offset}$ is a constant or configurable offset parameter.

12. The method of claim 11, wherein $\tilde{\beta}_{offset}=\beta_{offset}$.

13. The method of claim 2, wherein $\hat{Q}_{data}(Q')=Q_{all}-Q'$, and wherein:

$$Q' = O \times \beta_{offset} \times \max\left(\frac{Q_{all}}{g\left(\sum_{r=0}^{C_{n,0}-1} K_{0,r} \ldots \sum_{r=0}^{C_{n,N_{CW}}-1} K_{N_{CW}-1,r}\right) + O \times \beta_{offset}}, K_{min}\right),$$

wherein $\beta_{offset}$ is a predetermined offset and $K_{min}$ is a minimum inverse spectral efficiency value.

14. The method of claim 2, wherein calculating the number of control vector symbols to allocate to control information based on Q' comprises:

determining whether a compensation feature is enabled; and in response to determining that the compensation feature is enabled, calculating the number of control vector symbols to allocate to control information based on Q'.

15. A method for receiving user data and control information transmitted wirelessly over a plurality of transmission layers, comprising:

receiving a plurality of vector symbols over a plurality of transmission layers, wherein the vector symbols carry encoded user data and encoded control information;

determining a number of bits in one or more user data codewords carried by the vector symbols;

calculating a number of control vector symbols that have been allocated to control information, based at least in part, on:
  the number of bits in the one or more user data codewords, and
  an estimate of the number of vector symbols onto which the one or more user data codewords have been mapped, wherein the estimate of the number of vector symbols depends, at least in part, on the number of control vector symbols that have been allocated to control information; and decoding the received vector symbols based on the calculated number of control vector symbols.

16. The method of claim 15, wherein calculating a number of control vector symbols comprises determining a number of control vector symbols based, at least in part, on a value (Q') wherein:

$$Q' = f\left(\hat{Q}_{data}(Q'), \sum_{r=0}^{C_{n,0}-1} K_{0,r} \ldots \sum_{r=0}^{C_{n,N_{CW}}-1} K_{N_{CW}-1,r}, O\right)$$

and wherein $K_{q,r}$ is a number of bits in an r-th code block of a q-th codeword of user data to be transmitted during the subframe for r≥1 and q≥1, $C_{n,m}$ is a number of code blocks in an m-th codeword of user data for m≥1, $N_{CW}$ is a number of the one or more control codewords carried by the plurality of vector symbols, O is a number of bits in the one or more control codewords, and $\hat{Q}_{data}(Q')$ is an estimated number of vector symbols to be allocated to user data during the subframe and is dependent on the number of control vector symbols allocated to control information.

17. The method of claim 16, wherein determining the number of control vector symbols based, at least in part, on the value Q' comprises:

determining a nominal number of control vector symbols allocated to control information based, at least in part, on the value Q'; and determining a final number of control vector symbols by selecting the greater of the nominal number of control vector symbols and a minimum number of control vector symbols.

18. The method of claim 16, wherein determining the number of control vector symbols based, at least in part, on the value Q' comprises:

determining a nominal number of control vector symbols that have been allocated to control information based, at least in part, on the value Q'; and determining a final number of control vector symbols by selecting the lesser of the nominal number of control vector symbols and a maximum number of control vector symbols.

19. The method of claim 16, wherein determining a number of control vector symbols based, at least in part, on the value Q' comprises:

determining a nominal number of control vector symbols that have been allocated to control information based, at least in part, on the value Q'; and determining a final number of control vector symbols by converting the nominal number of control vector symbols to an integer value.

20. The method of claim 16, wherein:

$$\hat{Q}_{data}(Q') = Q_{all} - \alpha \cdot Q',$$

wherein $Q_{all}$ indicates a total amount of transmission resources allocated to a transmitter, and $\alpha$ is a constant or a configurable parameter.

21. The method of claim 20, wherein $Q_{all}$ is equal to a total number of subcarriers allocated to the transmitter for transmitting user data and control information during the subframe multiplied by a total number of vector symbols allocated to the wireless terminal for transmitting user data and control information during the subframe.

22. The method of claim 16, wherein calculating the number of control vector symbols to allocate to control information based on Q' comprises selecting a smallest Q' for which:

$$Q' \geq f\left(\hat{Q}_{data}(Q'), \sum_{r=0}^{C_{n,0}-1} K_{0,r} \ldots \sum_{r=0}^{C_{n,N_{CW}}-1} K_{N_{CW}-1,r}, O\right).$$

23. The method of claim 16, wherein calculating the number of control vector symbols that have been allocated to control information comprises scaling a nominal number of control vector symbols by an offset ($\beta_{offset}$) to calculate a final number of control vector symbols, such that:

$$Q' = f\left(\hat{Q}_{data}(Q'), \sum_{r=0}^{C_{n,0}-1} K_{0,r} \ldots \sum_{r=0}^{C_{n,N_{CW}}-1} K_{N_{CW}-1,r}, O, \beta_{offset}\right).$$

24. The method of claim 23, wherein:

$$Q' = \frac{\hat{Q}_{data}(Q') \times O}{g\left(\sum_{r=0}^{C_{n,0}-1} K_{0,r} \ldots \sum_{r=0}^{C_{n,N_{CW}}-1} K_{N_{CW}-1,r}, O\right)} \times \beta_{offset}.$$

25. The method of claim 24, wherein $$\hat{Q}_{data}(Q') = Q_{all} - \frac{\tilde{\beta}_{offset}}{\beta_{offset}} Q',$$

such that:

$$Q' = \frac{Q_{all} \times O}{g\left(\sum_{r=0}^{C_{n,0}-1} K_{0,r} \ldots \sum_{r=0}^{C_{n,N_{CW}}-1} K_{N_{CW}-1,r}\right) + O\tilde{\beta}_{offset}} \times \beta_{offset},$$

wherein $Q_{all}$ indicates a total amount of transmission resources allocated to a transmitter, and $\tilde{\beta}_{offset}$ is a constant or configurable offset parameter.

26. The method of claim 24, wherein $\tilde{\beta}_{offset} = \beta_{offset}$.

27. The method of claim 16, wherein $\hat{Q}_{data}(Q') = Q_{all} - Q'$, and wherein $$Q' = O \times \beta_{offset} \times$$

$$\max\left(\frac{Q_{all}}{g\left(\sum_{r=0}^{C_{n,0}-1} K_{0,r} \ldots \sum_{r=0}^{C_{n,N_{CW}}-1} K_{N_{CW}-1,r}\right) + O \times \beta_{offset}}, K_{min}\right),$$

wherein $\beta_{offset}$ is a predetermined offset and $K_{min}$ is a minimum inverse spectral efficiency value.

28. The method of claim 16, wherein calculating the number of control vector symbols that have been allocated to control information based on Q' comprises:

determining whether a compensation feature is enabled; and in response to determining that the compensation feature is enabled, calculating the number of control vector symbols that have been allocated to control information based on Q'.

29. An apparatus for wirelessly transmitting user data and control information using a plurality of transmission layers, the apparatus comprising:

a plurality of antennas;

a transceiver operable to transmit vector symbols over a plurality of transmission layers using the plurality of antennas; and a processor operable to:

determine a number of bits in one or more user data codewords to be transmitted during a subframe;

calculate a number of control vector symbols to allocate to control information during the subframe, based at least in part, on:

the number of bits in the one or more user data codewords, and an estimate of the number of user data vector symbols onto which the one or more user data codewords will be mapped, wherein the estimate of the number of user data vector symbols depends, at least in part, on the number of control vector symbols to be allocated to control information;

map one or more control codewords to the calculated number of control vector symbols, wherein the one or more control codewords comprise encoded control information; and transmit the user data vector symbols and the control vector symbols over the plurality of transmission layers during the subframe using the transceiver.

30. A node for receiving user data and control information transmitted wirelessly over a plurality of transmission layers, the node comprising:

a plurality of antennas;

a transceiver operable to receive vector symbols over a plurality of transmission layers using the plurality of antennas; and a processor operable to:

receive a plurality of vector symbols over a plurality of transmission layers using the transceiver, wherein the vector symbols carry encoded user data and encoded control information;

determine a number of bits in one or more user data codewords carried by the vector symbols;

calculate a number of control vector symbols that have been allocated to control information, based at least in part, on:

the number of bits in the one or more user data codewords, and an estimate of the number of vector symbols onto which the one or more user data codewords have been mapped, wherein the estimate of the number of vector symbols depends, at least in part, on the number of control vector symbols that have been allocated to control information; and decode the received vector symbols based on the calculated number of control vector symbols.

* * * * *